United States Patent [19]

Teraoka

[11] Patent Number: 4,771,653
[45] Date of Patent: Sep. 20, 1988

[54] POWER TRANSMISSION APPARATUS

[76] Inventor: Masao Teraoka, 73-3 Tomioka-cho, Sano-shi, Tochigi-ken, Japan

[21] Appl. No.: 923,833
[22] PCT Filed: Jan. 31, 1986
[86] PCT No.: PCT/JP86/00038
    § 371 Date: Nov. 10, 1986
    § 102(e) Date: Nov. 10, 1986
[87] PCT Pub. No.: WO86/04654
    PCT Pub. Date: Aug. 14, 1986

[30] Foreign Application Priority Data
    Jan. 31, 1985 [JP] Japan ............................ 60-15407
[51] Int. Cl.[4] ......................................... F16H 1/44
[52] U.S. Cl. ............................... 74/710.5; 74/711; 192/82 T; 192/58 B
[58] Field of Search ............... 74/711, 710.5, 844; 192/82 T, 58 B

[56] References Cited

U.S. PATENT DOCUMENTS

| 3,292,720 | 12/1966 | Harvey | 74/710.5 X |
| 3,323,389 | 6/1967 | Hause | 74/710.5 |
| 3,760,922 | 9/1973 | Rolt et al. | 74/710.5 X |
| 3,923,113 | 12/1975 | Pagdin | 192/82 T X |
| 4,022,084 | 5/1977 | Pagdin et al. | 74/711 |
| 4,040,271 | 8/1977 | Rolt et al. | 192/58 B |
| 4,048,872 | 9/1977 | Webb | 74/710.5 X |
| 4,058,027 | 11/1977 | Webb | 192/82 T X |
| 4,174,771 | 11/1979 | Hirt | 192/82 T X |
| 4,444,298 | 4/1984 | Stangroom | 192/58 B X |
| 4,559,847 | 12/1985 | Newendorp et al. | 74/710.5 |

FOREIGN PATENT DOCUMENTS

| 3440492 | 5/1986 | Fed. Rep. of Germany | 74/710.5 |
| 2302457 | 9/1976 | France | 192/82 T |

Primary Examiner—Dirk Wright
Attorney, Agent, or Firm—Samuels, Gauthier, Stevens & Kehoe

[57] ABSTRACT

In an operation chamber 19 filled with silicone oil, there is provided a first resistance plate 21, which is splinemated to the outer circumference of a first transmission shaft 3, and a second resistance plate 23, which is splinemated to a second transmission shaft 9. These two resistance plates 21, 23 are clamped at both sides thereof by a clamp means formed from a pair of ring members 27, 29. The ring members 27, 29 are joined to a piston formed from the first transmission shaft 3, the sideplate 11, and a stopper ring 25. Then, when this piston moves in thrust and the clearance between the ring members 27, 29 shrinks, the blocks of the first resistance plate 21 and the second resistance plate 23 arranged side by side are clamped and abutted closely to produce a friction force at the resistance plates 21, 23.

5 Claims, 7 Drawing Sheets

POWER TRANSMISSION APPARATUS

FIELD OF THE INVENTION

This invention relates to a power transmission apparatus for use in, for example, a vehicle.

BACKGROUND OF THE INVENTION

The differential gear device of a vehicle is used to absorb the differential produced between front and rear wheels and left and right wheels. In order to avoid the situation that a wheel on one side rotates at a high speed under no load due to slipping etc. whereas the driving power is lost in the wheel on the other side, a power transmission apparatus is provided with a slip limitation or restriction function by using a viscous resistance of a high viscous fluiud, which is disclosed, for example, in Japanese Patent Publication No. 58-48779.

Figure 7:
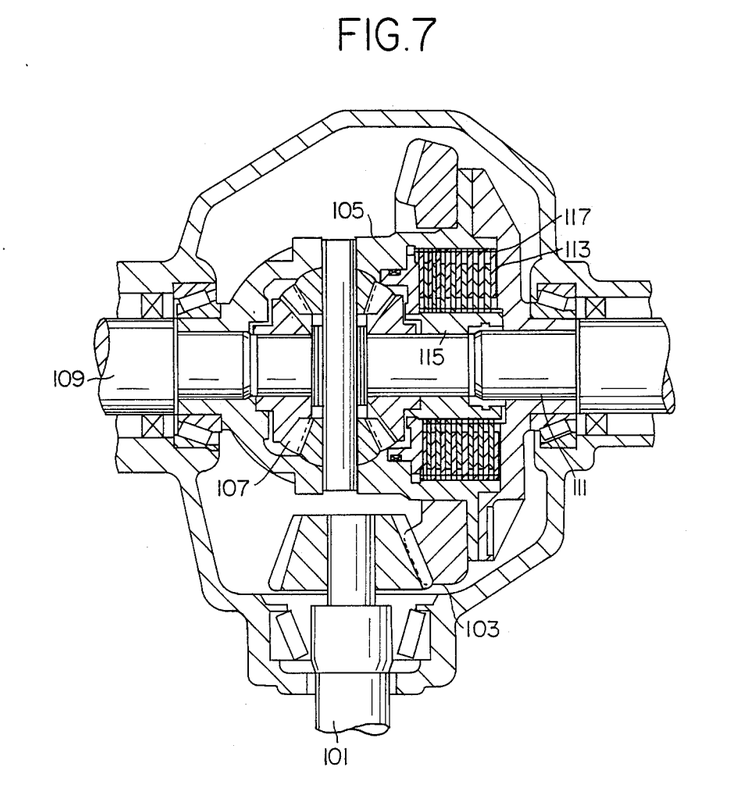
FIG. 7 is a cross-sectional view of a conventional apparatus.

Referring to FIG. 7, for example, in a differential apparatus in which power from an input shaft 101, is transmitted through an input gear 103, a gear case 105 and a differential gear 107 and is divided there for transmission to a first transmission shaft 109 and a second transmission shaft 111 arranged on the left and right sides, an operation chamber 113 is formed to sealingly enclose part of the periphery of the second transmission shaft 111 as shown on the right side of FIG. 7.

Formed between the operation chamber 113 and the second transmission shaft 111 are a plurality of disk-shaped resistance plates 117 which are arranged with a short space therebetween perpendicular to the axis through a bush 115 secured to the outer periphery of the second transmission shaft 111.

The resistance plates 117 are alternatively engaged with the outer periphery of the bush 115 and with the inner periphery of the operation chamber 113. The operation chamber 113 is filled with a high viscous fluid such as silicone oil etc.

With this type of apparatus, the slip limitation function of the resistance plates 117 does not become effective under relatively low differential speed conditions, e.g., when the vehicle is traveling along a straight path or negotiating a curve. However, when a wheel on one side slips during running on a rough road, the driving shaft only on this side is subjected to a lower load, so that the input is transmitted to this side only, which will cause fast rotation under no load. In this situation, a rapid relative rotation is caused between the gear case 105 and the second driving shaft 111, a higher resistance force is acted between the resistance plates 117 and the high viscous fluid to limit the slip between the gear case 105 and the second driving shaft 111, thereby providing power transmission between them and preventing one-side torque transmission toward the shaft on the lower load side, making it possible to provide power transmission toward the driving shaft on the higher load side.

However, in such a power transmission apparatus in which the slip limitation function is utilized only by using the viscous resistance of high viscous fluid, the torque transmission capability is determined only by the coefficient of viscosity of the viscous fluid, the size and shape of the resistance plates and the coefficient of surface friction, so that the apparatus becomes large to increase the torque transmission capability. Further, a rapid relative movement between the both shafts causes a resistance force for torque transmission, which is a power transmission allowing slipping to an extent between the both shafts, so that the whole apparatus becomes large due to the small initial torque transmission capability, which is a shortcoming of the power transmission apparatus. In addition, the slip limitation characteristic is substantially constant with reference to the relative movements, which could not be readily changed. Accordingly, it cannot respond to subtle changes in the running conditions.

This invention is created to overcome these problems in the prior art, wherein the viscous resistance of a fluid is utilized with the operation characteristics and torque transmission capacity improved and with the whole apparatus being compact.

Another object of the present invention is to provide a power transmission apparatus which readily responds to variations in the running conditions by arbitrarily adjusting the operation characteristics and torque transmission capacity.

DISCLOSURE OF THE PATENT

A power transmission apparatus of the present invention comprises a power transmission apparatus having first and second transmission shafts which are rotatable relative to each other, an operation chamber sealingly provided between the first and second transmission shafts and filled with a viscous fluid therein, first resistance plates placed within the operation chamber such that they can rotate together with the first transmission shaft, second resistance plates placed within the operation chamber and engaged with the second transmission shaft in a circumferential direction to be capable of thrust movement, a piston being capable of thrust movement as the pressure in the operation chamber increases, and clamping means associated with the thrust movement of the piston for clamping the first and second resistance plates.

The invention further includes a pressure control mechanism for controlling the pressure within said operation chamber through control from outside. According to the construction of the present invention, the power transmission apparatus is compact light weight with a slip limitation function utilizing the viscous resistance of a fluid with a decreased time lag.

The slip limitation function can be obtained before the slipping occurs.

Since the slip limitation function can be changed in a broader diversified manner in correspondence with the running conditions, running stability is improved substantially

MOST PREFERABLE MODES FOR CARRYING OUT THE INVENTION

The following is a description corresponding to the attached drawings to explain the present invention in detail. Referring to one embodiment of this invention in FIG. 1, an input shaft 1 is placed in the central portion of the apparatus. On the outer periphery of the input shaft 1, a first transmission shaft 3 is rotatably provided through a bearing therebetween. The first transmission shaft 3 is hollow and coaxial with the input shaft 1. The first transmission shaft 3 is connected at one end through a differential gear mechanism 5 of planetary gear type to the input shaft 1. The first transmission shaft 3 is provided with a spline 7 at the other end thereof to which another transmission member is inserted and leads to a front wheel driving shaft (not shown).

Figure 1:
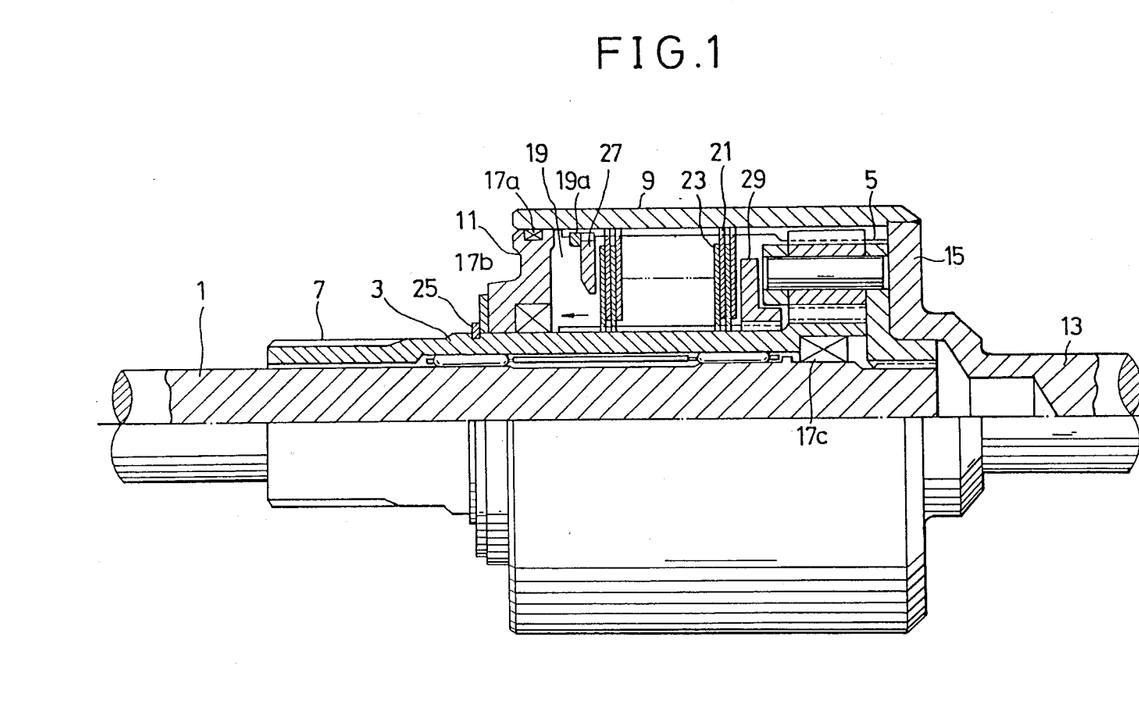
FIG. 1 is a cross-sectional view of a first referred embodiment of the present invention

Disposed on the outside of the first transmission shaft 3 is a second transmission shaft 9 which is coaxial with the first transmission shaft 3 and closed at one end with a side plate 11. The first transmission shaft 3 rotatably extends through the central portion of the side plate 11. The side plate 11 is sealingly secured to one end of the second transmission shaft 9 to be capable of thrust movement, thereby rotating together with the second transmission shaft 9. The outer end of the second transmission shaft 9 is integrally connected to a disk-like member 15 at one end of a rear-side driving shaft 13 provided adjacent to the axis, and is connected near here to the input shaft 1 through the differential apparatus 5.

The first transmission shaft 3, the second transmission shaft 9, the side plate 11, a hollow portion close to the one shaft end of the rear wheel side driving shaft 13, the disk like member 15 and a portion adjacent to the shaft end of the input shaft 1 form a fluid tight enclosed space therein which is further sealed with seal mechanisms 17a, 17b and 17c to form an operation chamber 19.

The differential apparatus 5 is disposed within the operation chamber 19. In addition, within the chamber 19, a plurality of first resistance plates 21 of a disk-shape and a plurality of second resistance plates 23 of a disk-shape are alternatively arranged for thrust movement parallel to the central axis. The first resistance plates 21 has ports and are spline-fitted onto the outer peripheral portion of the first transmission shaft 3, and the second resistance plates 23 have ports and are spline-fitted into the inner peripheral portion of the second transmission shaft 9.

The operation chamber 19 is filled with a high viscous fluid e.g. silicone oil. The silicone oil can contain a lubricant oil including molybdenum disulfide particles. Thus, an oil film is formed between the resistance plates 21 and 23. The inner circumferential side of the sideplate 11 which forms one part of the operation chamber 19 rotates freely in a fluid tight manner with the first transmission shaft 3. In addition, a stopper ring 25 is mounted on the first transmission shaft 3 in the vicinity of the outside position of the sideplate 11, and regulates the displacement of the sideplate 11 in relation to the first transmission shaft 3 in the outer direction of the sideplate 11. The outer circumference of the sideplate 11 is capable of sliding in the thrust direciton in a fluid tight manner with the second transmission shaft 9. The inner circumference of the end section on the inside of the operation chamber 19 of the first transmission shaft 3 is fluid tight with the input shaft 1. Both shafts freely rotate relative to one another, and a slight sliding in the thrust direction is also possible. Accordingly, when the pressure within the operation chamber 19 is elevated, the sideplate 11 and the first transmission shaft 3 become a member, specifically a piston, which can move within a range of distance set in the outer side (the left side in FIG. 1). A pair of ring members 27 and 29 are positioned at opposite ends respectively of the alternating group of resistance plates 21,23 inside the operation chamber 19. The one ring member 27 is attached to the inner circumference of the second transmission shaft 9. The other ring member 29 is attached to the first transmission shaft at a location adjacent to the section where the differential device 5 is connected. A stopper 19a which protrudes from the inner circumference of the second transmission shaft 9 is provided between the ring member 27 and the sideplate 11. The ring member 27 is regulated by the stopper 19a so that it cannot move beyond this position toward the sideplate 11.

In the above configuration, when the piston made up of components 3, 11, 25 is activated, the one ring member 27 is not displaced, and the other ring member 29 is integrated with the first transmission shaft 3 to move in the thrust direction. Thus, the resistance plates 21,23 are axially urged together by the clamping force of ring member 29 acting in concert with ring member 27.

The first resistance plates 21 and the second resistance plates 23 are juxtaposed, interposing a thin film of high viscosity fluid therebetween. Both the resistance plates don't contact to each other or contact with little fastening force effective to each other. An input force is transmitted to the first transmission shaft 3 and the second transmission shaft 9 from the input shaft 1 through the differential mechanism 5. The input force is transmitted to the driving shafts of the front wheels and rear wheels. No differential absorption phenomena occurs in the differential mechanism 5 or no relative rotation occurs between the first transmission shaft 3 and the second transmission shaft 9 until some differential rotation is experienced between the front and rear wheel driving shafts in which event the front and rear wheels rotate at the same speed and in the same direction.

However, if the front wheels slip, driving torque of the first transmission shaft 3 connected to the front wheels considerably decreases, resulting in that the input torque is transmitted only to the first transmission shaft 3 to allow the high speed rotation of the first transmission shaft 3. In this condition, power transmission is achieved by virtue of the slip limitation function provided by viscous resistance of the fluid to relative rotation between the resistance plates 21, 23.

Further in the first embodiment of the present invention, in addition to the function and operation mentoned above, expected use is made of the fluid pressure increase accompanying a temperature rise in the viscous fluid caused by relative high speed rotation between the resistance plates 21, 23. More particularly, this increased pressure causes the piston assembly made up of elements 3, 11 and 25 to axially shift to the left as viewed in FIG. 1. As a result, the resistance plates 21, 23 are axially urged together by the clamp rings 27,29 to thereby provide a friction clutch mechanism.

Consequently, in accordance with the present invention, power transmission capability from the first power transmission shaft 3 and the second power transmission shaft 9 is extraordinarily improved at the same condition relative to the prior art.

In other words, an apparatus of considerably small and light weight relative to the conventional device can transmit the same level of torque compared with the conventional apparatus.

Figure 2:
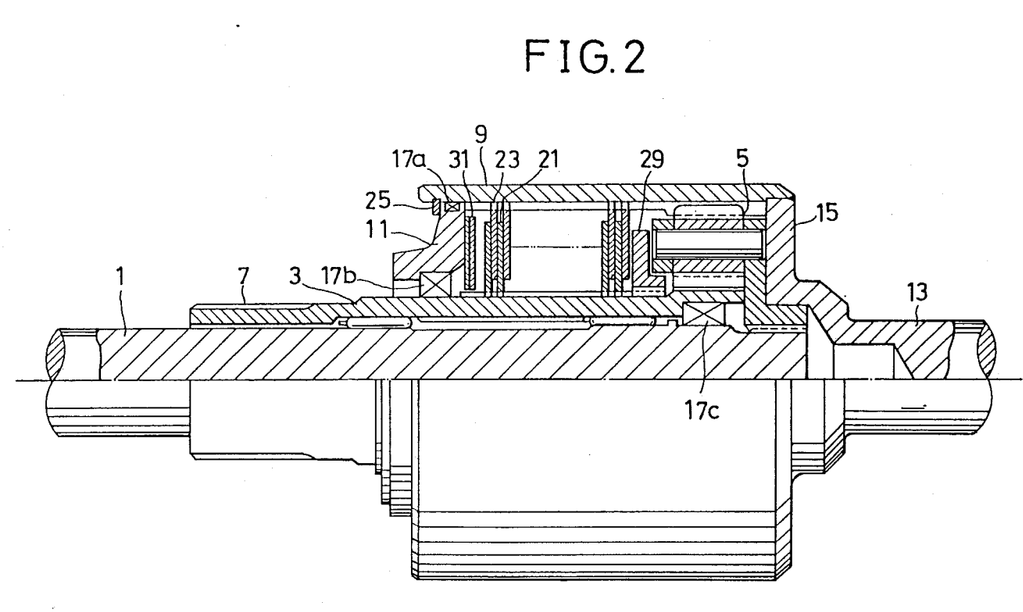
FIG. 2 is a cross-sectional view of a second embodiment.

FIG. 2 shows a second embodiment of the present invention. The same reference numbers are used for all structural parts which are substantially the same as in the first embodiment. In this embodiment, a ring body 31, which has a bimetallic construction or which is made up of a fluid with a high thermal coefficient of expansion enclosed in a film of elastic material, is positioned on the inside of the sideplate 11 of the first embodiment, and the stopper ring 25 is mounted on the side of the second transmission shaft 9. In this embodiment, the displacement accompanying the thermal expansion or distortion of this ring body 31 when the temperature is elevated is used as the energizing means in the axial clamping of the first and second resistance 21,23 together other in a more reliable and strong manner so that the power transmission efficiency is improved.

Figure 3:
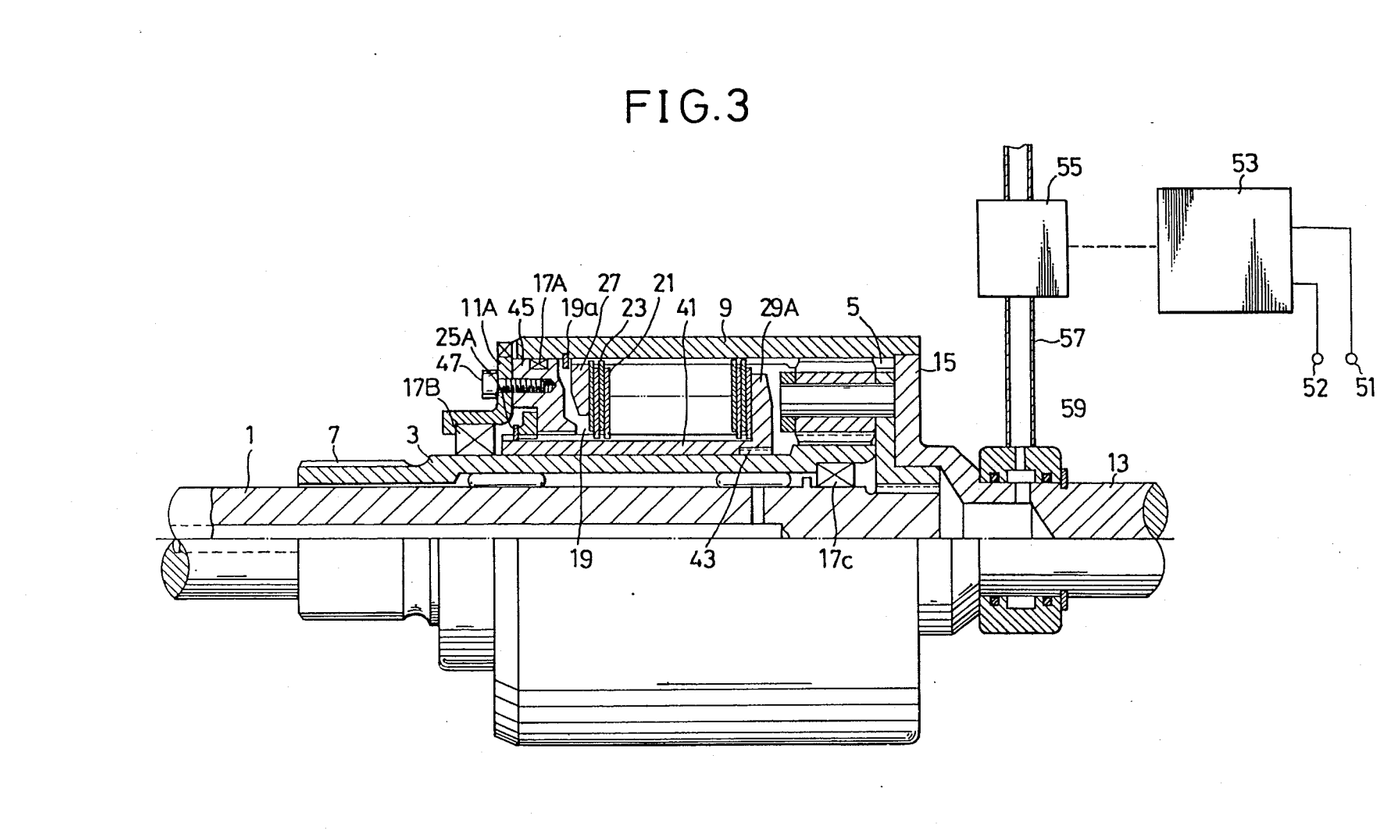
FIG. 3 is a cross-sectional view of a third embodiment.

FIG. 3 shows a third embodiment. The members which are the same as those used in the first embodiment are again indicated by the same reference numerals. The second transmission shaft 9 is blocked at one end with reference to the first transmission shaft 3 by a side plate 11A which is somewhat L shaped in cross section. The outer periphery portion of the side plate 11A is engaged with the shaft end of the second transmission shaft 9 for thrust movement. The inner pheriphal portion is fluid tightly engaged with the outer periphery of the first transmission shaft 3 through a seal mechanism 17c for rotation and thrust movement.

The other end of the second transmission shaft 9 is fluid-tightly and integrally connected to a disk like member 15 at one end of the rear wheel side driving shaft 13 provided adjacent to the axis. The other end of the second transmission shaft 9 is also connected to the input shaft 1 through the differential gear mechanism 5.

Another hollow shaft 41 is rotatably provided in a coaxial relationship with the first transmission shaft 3 and on the outer periphery of the first transmission shaft 3. The end of the hollow shaft 41 on the side of the differential gear mechanism 5 is provided with a spline 43 connecting it to the first transmission shaft 3 for thrust movement. An annular member 29A is integrally provided on the outer periphery of the end of the hollow shaft 41. Mounted on the outer periphery of the other end of the hollow shaft 41 is a stopper ring 25A on one side of which an annular piston 45 is rotatably inserted. The piston 45 is engaged in a fluid tight manner on the outer periphery thereof with the inner periphery of the second transmission shaft 9 through a seal mechanism 17A for thrust movement. Piston 45 is also connected to the side plate 11 through a bolt means 47.

Disposed at a position inward of the piston 45 placed at one end of the interior of the operation chamber 19 is an annular member 27 fitted into the inner periphery of the second transmission shaft 9. A stopper ring 19a is provided between the annular member 27 and a piston 45 to prevent the further axial movement of the annular member 27 toward the piston 45.

The annular member 27 and the annular member 29A at one end of the hollow shaft 41 clamp the first and second resistance plates 21 and 23 in groups, thus forming a clamping means for the resistance plates 21 and 23 associated with the thrust movement of the piston 45.

The piston 45 provides for thrust movement by the pressure variation within the operation chamber 19. The pressure is controlled by an outside control comprising a pressure control mechanism, which is comprised of a sensor 51, 52, a controller 53, a regulator 55 and operating fluid. The sensors are to detect the road conditions to which each wheel comes into contact and the differential rotations of the wheels. The operating fluid may be the same as the high viscous fluid with lubrication within the operating chamber 19. The operating fluid flows through a conduit 57, which is connected to the hollow portion of the end of the rear wheel driving shaft 13 through a connector 59, and communicated with the operation chamber 19. The connector 59 is the type of surrounding rotatably the rear wheel side driving shaft 13.

In accordance with the third embodiment, the sensors 51 and 52 sense or detect the condition of road through movements of the suspension devices and the controller 53 controls the driving condition of the car. When the car enters on the rough road which will bring any slippage to the wheels, the controller outputs immediately adjusts the operation liquid pressure to raise the pressure by means of a regulator 55. The rising of pressure is transmitted from the conduit 57 to the operation chamber 19 through the connector 59. As a result, the piston 45 undergoes thrust movement reducing the distance between the ring members 27 and 29A which comprising a clamp device and compressing the first and second resistance plates 21 and 23 in groups arranged in a manner mentioned above. The resistance plates are so intimately contacted to each other as to produce or obtain the predetermined friction force. As described above in detail, the car constructed according to the present invention demonstrates a suitable slippage limitation function which corresponds to condition of the rough road at the early stage of the car entering onto the rough road and also the car can enjoy considerably improved power for getting the wheels or car out of the rough road when some slippage happens on the wheels, and improved straight-running capability or stable-running characteristic during running on a rough-road.

During running on the flat road, the sensors 51 and 52 are changed from the detection mode of the road surface condition to the detection mode of the rotation differential between the wheels, and controlled to provide suitable slip limitation while absorbing the rotation differential between the front and rear wheels during running along a curve.

By controlling the pressure within the operation chamber 19 from outside with a controller 53, the operation forces of the slip limitation function, operation characteristics, the operation timing with a combination of sensors 51, 52 and other adjustment and design changes can be made in a very broader diversified manner as described hereinafter, and further can be done either automatically or manually.

Now, in the case where the pressure in the operation chamber 19 is not controlled from outside, pressure regulation remains a function of the temperature variations of the viscous liquid caused by relative high speed rotation of the plates 21,23.

Accordingly, the first transmission shaft 3 and the second transmission shaft 9 are joined through the thrust movement of the piston 45 and the activation of the clamp means of the two resistance plates 21, 23. The relationship between the strength of the joint and the temperature inside the operation chamber 19 is shown by the line A in FIG. 4.

Figure 4:
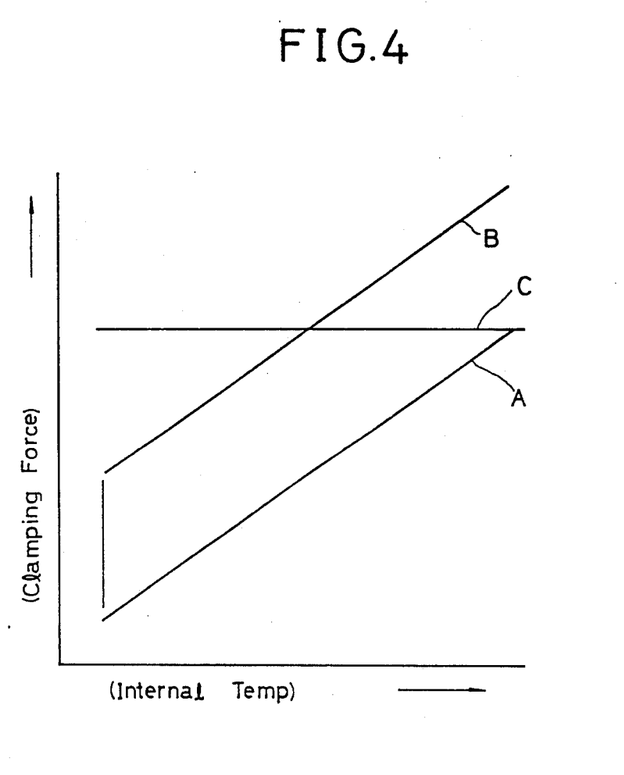
FIG. 4 is a graph showing several examples of operation characteristics of the third embodiment.

On the other hand, since the pressure within the operation chamber 19 is controlled from outside in the third embodiment, a certain pressure is used for clamping from the initial state, and then the clamping power together with the internal temperature can be increased as shown line B shifted upwardly from line A in FIG. 4.

Further, as shown by line C in FIG. 4, the clamping force can be constant from a lower internal temperature to a higher internal temperature in the operation chamber 19. This is accomplished by increasing the pressure from outside, when the temperature within the operating chamber 19 is low, and then decreasing the pressure from outside as the clamping force is increased with the increased temperature and pressure within the operation chamber 19.

Consequently, the control pressure from outside can be differently set and changed to obtain arbitrary clamping characteristics, that is, slip limitation characteristics, which is an improvement over the temperature and pressure relationship in the case where the temperature within the operation chamber 19 is not controlled from outside.

Figure 5:
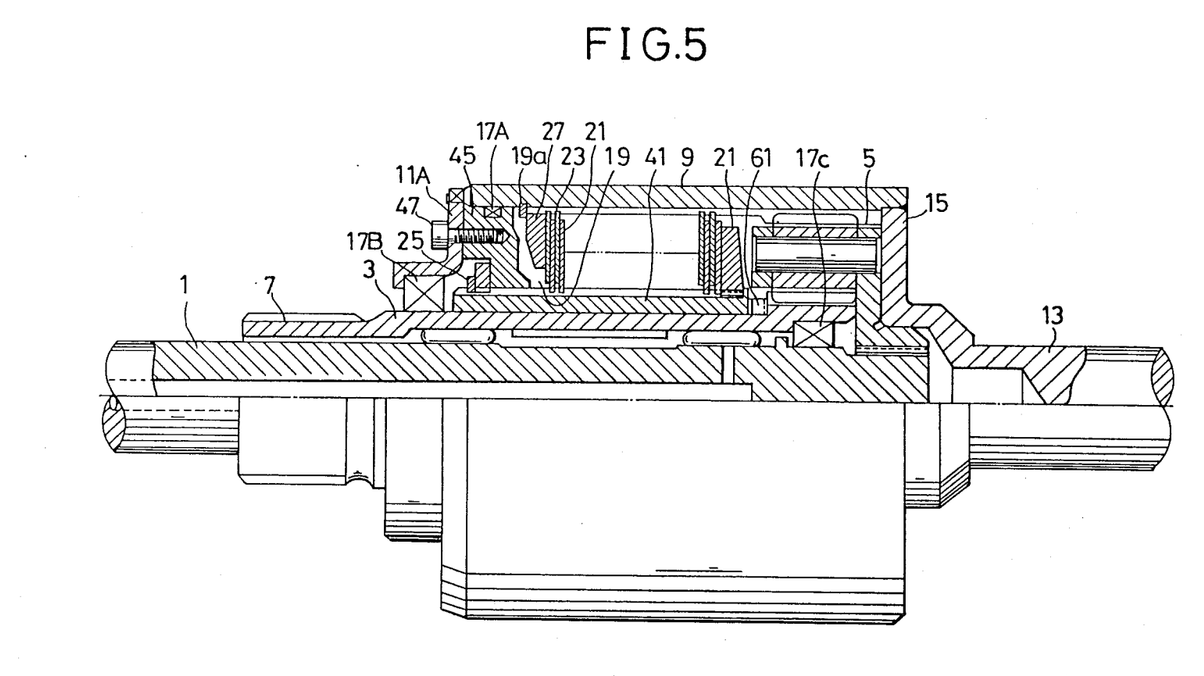
FIG. 5 is a cross-sectional view of a fourth embodiment.

FIG. 5 shows a fourth embodiment of the present invention. The same reference numbers are used for all structural parts which are substantially the same as in the first to third embodiments, and no further explanation will be made here. In this embodiment, a cam mechanism 61 is positioned between the first transmission shaft 3 and the end section of the hollow shaft 41 on the side of the differential device 5 shown in the third embodiment.

With the cam mechanism 61 between the first transmission shaft 3 and the hollow shaft 41, when the front wheel side drive shaft, specifically, the first transmission shaft 3 is about to rotate at high speed, and then the cam mechanism 61 is about to drive the hollow shaft 41, at that time, a thrust force is developed in the cam mechanism 61 corresponding to the drive torque of the hollow shaft 41, which corresponds to the relative rotational and second resistance plates 21,23. This thrust force is added to the clamp means of the resistance plates through the action of the piston 45 accompanying the pressure elevation in the operation chamber 19. Then, by means of the cam mechanism 61, the thrust force is operated from the instant that the relative rotation is produced and there is almost no time lag. When this thrust force is also added to the clamp means, causing the tendency to strengthen the clamp between the resistance plates, the torque on the cam mechanism 61 increases. As a result, the thrust force at this cam mechanism 61 becomes large, and the clamp between the resistance plates 21, 23 is strengthened even further. The activation force of the piston 45 is strongly energized through a pressure increase inside the operation chamber 19, and the power transmission capability between the first transmission shaft 3 and the second transmission shaft 9 increases even more rapidly under identical conditions. Therefore, extrication from bad conditions, such as the slipping of one side of the vehicle, can be extremely fast and accurate. In other words, for the same torque transmission, each stage of the power transmission device is made small and light.

Figure 6:
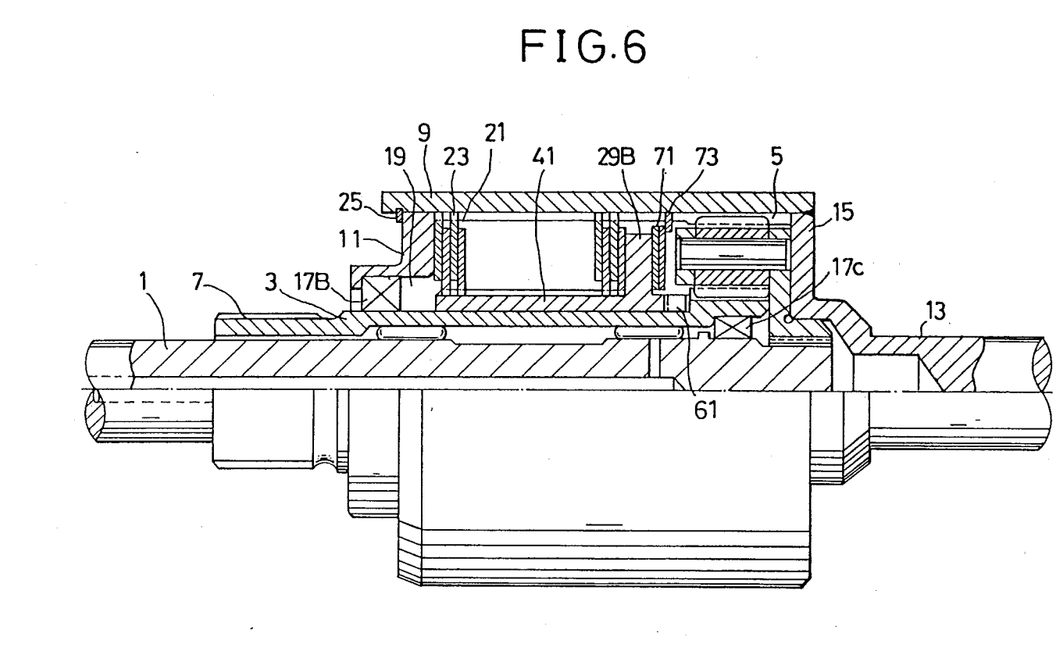
FIG. 6 is a cross-sectional view of a fifth embodiment.

FIG. 6 shows a fifth embodiment of the present invention. In this embodiment, instead of the thrust movement of the piston caused by the pressure elevation in the operation chamber 19, either a bimetal ring body 71 or a ring body of fluid with a high coefficient of expansion enclosed in a film of elastic material is positioned so that it contacts one surface of a ring member 29B of the hollow shaft 41 on the side of the cam mechanism 61, the one surface being opposite to the other surface of the ring member 29B which contacts the first resistance plate 21 and the second resistance plate 23, and then its outer side is in contact with the stopper ring 73. One end surface of the block of the first resistance plate 21 and of the block of the second resistance plate 23 directly contacts the sideplate 11. With this type of configuration, the clamp means of the first and second resistance plates 21,23 uses the displacement of the bimetal ring body accompanying the elevation of temperature in the operation chamber 19 as activation power, which is augmented by the thrust force by means of the cam mechanism 61.

Possibilities for Industrial Application

As outlined above, the power transmission device of the present invention provided between the front and back wheels, or between the left and right wheels of a vehicle is suitable for effectively limiting the differential between the wheels.

I claim:

1. A power transmission apparatus comprising:
 first and second transmission shaft means rotatable relative to each other;
 an operation chamber hermetically disposed between the first and second transmission shaft means and filled with a viscous fluid;
 a first resistance plate means disposed within the operation chamber and being rotatable together with the first transmission shaft means;
 a second resistance plate means disposed within the operation chamber and being slidably movable along and circumferentially engaged with the second transmission shaft means for rotation therewith;
 a piston means moved in a thrust direction by an increase of fluid pressure within the operation chamber and receiving such pressure over the entire inner wall surface of said piston means;
 actuating means for urging the first and second resistance plate means together in association with the movement of the piston means in the thrust direction, said actuating means comprising a first annular member disposed in the operation chamber and moved together with the first transmission shaft means in the thrust direction, and a second annular member disposed in the operation chamber and fixed to the inner circumference of the second transmission shaft means; and
 stopper means fixed to the first transmission shaft means and engagable with the piston means when the piston means is moved in the thrust direction so that the distance between the first and second annular members is reduced and the distance between the first and second resistance plate means is reduced.

2. A power transmission apparatus as claimed in claim 1, wherein said apparatus further comprises means arranged externally of said operation chamber for controlling the fluid pressure within said operation chamber.

3. A power transmission apparatus as claimed in claim 1, wherein said first and second transmission shaft means are connected to an input shaft through a differential device.

4. A power transmission apparatus as claimed in claim 1, wherein said actuating means further comprises a second stopper means for restricting the movement of the second annular member in the thrust direction.

5. A power transmission apparatus comprising: first and second transmission shaft means concentrically arranged for rotation relative to each other about a common axis, said transmission shaft means being radially spaced one from the other; first and second end closure means carried respectively by said first and second transmission shaft means and coacting therewith to define a fluid tight operation chamber filled with a viscous fluid; first and second ring members axially spaced one from the other within said chamber and carried respectively by said first and second transmission shaft means; means associated with said first and second transmission shaft means for limiting axial movement of said first and second ring members away from each other; a plurality of first and second interleaved resistance plates located in said chamber between said first and second ring members, said first and second resistance plates being respectively rotatably fixed to and axially movable along said first and second transmission shaft means, the arrangement being such that as the pressure of the viscous fluid in said chamber increases, said first end closure means is axially forced in a thrust direction with respect to said second end closure means; and stopper means arranged externally of said chamber for opposing movement of said first end closure means relative to said first transmission shaft means in the thrust direction, thereby causing said first transmission shaft means to shift axially in the thrust direction with respect to said second transmission shaft means and causing said first and second ring members to be drawn together to axially compact said resistance plates therebetween.

* * * * *